United States Patent
Stephenne et al.

(10) Patent No.: US 11,228,364 B2
(45) Date of Patent: Jan. 18, 2022

(54) SYSTEMS AND METHODS FOR UPLINK COVERAGE ADAPTATION

(71) Applicant: Telefonaktiebolaget LM Ericsson (publ), Stockholm (SE)

(72) Inventors: Alex Stephenne, Stittsville (CA); Chandra Sekhar Bontu, Nepean (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 426 days.

(21) Appl. No.: 15/546,042

(22) PCT Filed: Apr. 13, 2017

(86) PCT No.: PCT/IB2017/052161
§ 371 (c)(1),
(2) Date: Jul. 25, 2017

(87) PCT Pub. No.: WO2018/189573
PCT Pub. Date: Oct. 18, 2018

(65) Prior Publication Data
US 2018/0337725 A1     Nov. 22, 2018

(51) Int. Cl.
*H04W 16/28* (2009.01)
*H04B 7/26* (2006.01)
(Continued)

(52) U.S. Cl.
CPC ......... *H04B 7/2603* (2013.01); *H04B 7/0408* (2013.01); *H04B 7/0617* (2013.01); *H04W 16/28* (2013.01)

(58) Field of Classification Search
CPC .. H04W 16/28; H04W 74/006; H04B 7/0617; H04B 7/0628; H04B 10/1121
See application file for complete search history.

(56) References Cited

U.S. PATENT DOCUMENTS

| | | | |
|---|---|---|---|
| 2011/0069633 A1 | 3/2011 | Schmidt et al. | |
| 2014/0323143 A1* | 10/2014 | Jung | H04B 7/0617 455/452.1 |
| 2016/0337916 A1* | 11/2016 | Deenoo | H04W 8/22 |

FOREIGN PATENT DOCUMENTS

| | | |
|---|---|---|
| CN | 104349399 A | 2/2015 |
| CN | 105393468 A | 3/2016 |

(Continued)

OTHER PUBLICATIONS

Author Unknown, "Technical Specification Group Radio Access Network; Evolved Universal Terrestrial Radio Access (E-UTRA); Radio Resource Control (RRC); Protocol specification (Release 13)," Technical Specification 36.331, Version 13.5.0, 3GPP Organizational Partners, Mar. 2017, 638 pages.

(Continued)

*Primary Examiner* — Tu X Nguyen
(74) *Attorney, Agent, or Firm* — Withrow & Terranova, PLLC

(57) ABSTRACT

Systems and methods relating to adjusting uplink coverage in a cellular communications network are disclosed. In some embodiments, a method of operation of a network node to adjust uplink coverage for one or more cells in a cellular communications network comprises determining that there is a need to adjust uplink beam transformations for one or more cells of a plurality of cells in a cellular communications network. For each cell of the one or more cells, the uplink beam transformation for the cell is a transformation of received uplink signals for the cell from an antenna domain to a beam domain. The method further comprises, upon determining that there is a need to adjust the uplink beam transformations for the one or more cells, determining (Continued)

*Illustration of beam domain processing in the uplink and the need to match the coverage of the uplink beam space and the coverage of the downlink common channels* new uplink beam transformations for the one or more cells and applying the new uplink beam transformations for the one or more cells.

17 Claims, 13 Drawing Sheets

(51) Int. Cl.
*H04B 7/06* (2006.01)
*H04B 7/0408* (2017.01)

(56) References Cited

FOREIGN PATENT DOCUMENTS

| EP | 2424302 A1 | 2/2012 |
|---|---|---|
| WO | 2016115717 A1 | 7/2016 |

OTHER PUBLICATIONS

International Search Report and Written Opinion for International Patent Application No. PCT/IB2017/052161, dated Dec. 15, 2017, 16 pages.
First Office Action for Chinese Patent Application No. 201780091985.5, dated Jun. 1, 2021, 24 pages.
Examination Report for European Patent Application No. 17720575.4, dated Sep. 20, 2021, 7 pages.

* cited by examiner

*Illustration of beam domain processing in the uplink and the need to match the coverage of the uplink beam space and the coverage of the downlink common channels*

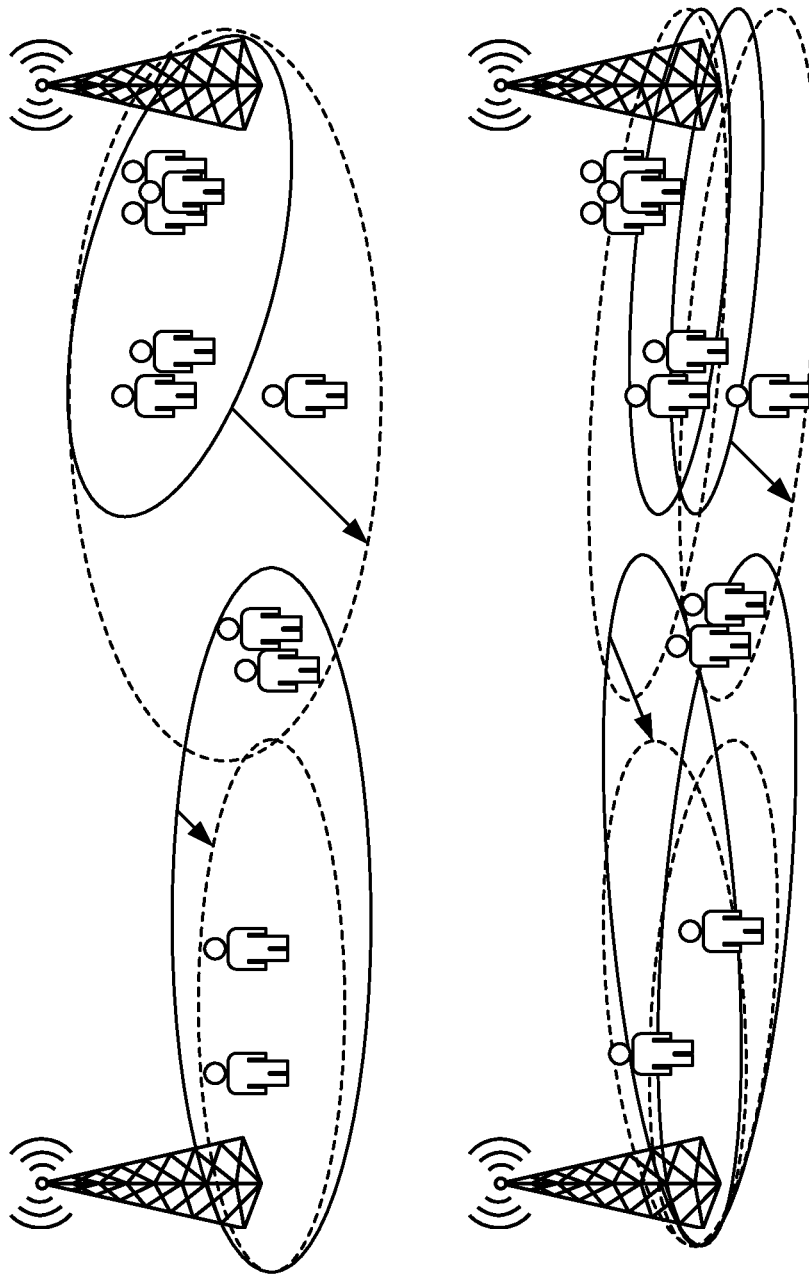

FIG. 3

*Upper part: illustration of traditional cell shaping, i.e. modification of the coverage of the common downlink control signals.*

*Lower part: illustration of uplink beam domain with only two beams (for the sake of simplifying the illustration) and the associated uplink beam transformation (including uplink power control) change associated with the cell shaping to match the downlink cell coverage changes*

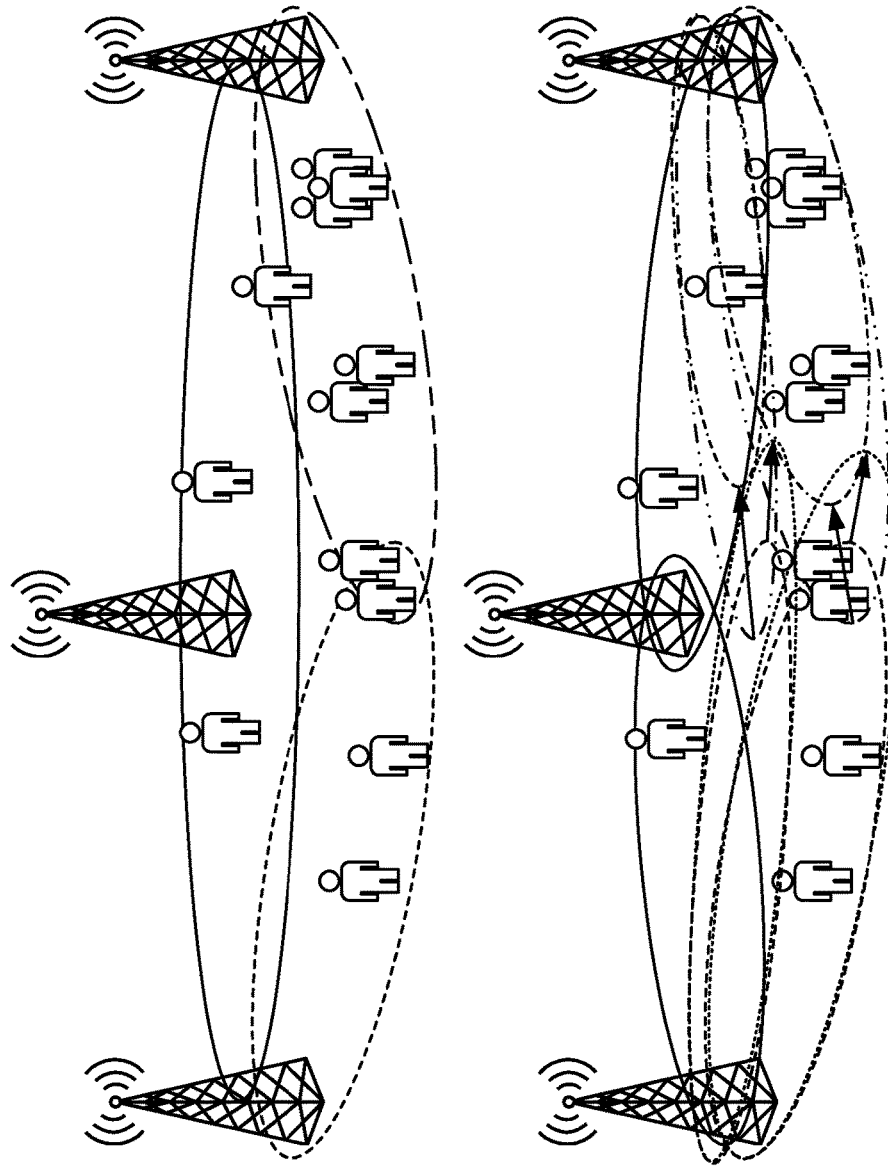

FIG. 4

Upper part: No modification of the coverage of the common downlink control signals
Lower part: Illustration of uplink beam domain with only two beams and the associated uplink beam transformation (including uplink power control) change associated with the cell shaping to better match uplink traffic distribution without impacting the multicellular uplink/downlink coverage match

SYSTEMS AND METHODS FOR UPLINK COVERAGE ADAPTATION

This application is a 35 U.S.C. § 371 national phase filing of International Application No. PCT/IB2017/052161, filed Apr. 13, 2017, the disclosure of which is incorporated herein by reference in its entirety.

TECHNICAL FIELD

The present disclosure relates to cellular communication and, more specifically, to adaptive uplink coverage when using advanced antenna systems.

BACKGROUND

Advanced (or adaptive) antenna systems (AAS) are antenna systems with numerous antenna elements and Radio Frequency (RF) chains. For some advanced antenna systems, instead of performing signal processing directly in the antenna domain, a large part of the signal processing is performed in a beam domain to reduce the computational complexity of receiver processing. More specifically, a transformation is applied to signals received via multiple antenna elements to transform the signals from the antenna domain to a beam domain or, in general, to any orthonormal transform domain in which component orthonormal functions are spatially orthogonal, the orthonormal transform domain being possibly of lower dimensionality than the antenna. Signal processing is then performed in the beam domain (or the orthonormal transform domain, in the more general case). Dimensionality reduction in the beam domain is possible when only beam signals received from the user directions are kept for processing. In other words, dimensionality reduction, i.e. the number of received signal copies that are required to be processed to detect the data, is achieved by selecting the appropriate signals from the beam domain, which have significant useful signal power. By not including the signals which are determined to carry insignificant useful signal content, detection performance can be improved (by eliminating noisy signals). In the antenna domain, all or most of the received signals have to be processed to capture the useful signal content. The possible advantages of working in the beam domain include complexity reduction and improved desired signal estimation/detection performance resulting from the redistribution of the power associated with spatially colored interference and unknown channel coefficients to estimate. In general, each orthonormal function can be selected to represent a geometric space within the coverage area.

Cell shaping relates to acting on the advanced antenna systems of a network to modify the cell coverage of traffic and control channels for specific cells in a cellular network while maintaining network area coverage. Cell coverage can be determined by common downlink control signals such as synchronization and cell specific reference signals, e.g. Common Reference Signal (CRS) in Long Term Evolution (LTE) or the Primary Common Pilot Channel (P-CPICH) in Wideband Code Division Multiple Access (WCDMA). Cell shaping can be achieved by modifying the antenna beam, horizontally and/or vertically. In other words, possible actions made to the advanced antenna system to provide cell shaping can include mechanical and/or electrical tilting/rotation of the antenna panel, and/or modification of the analog/digital/hybrid beamforming mechanism to widen/narrow/steer the beam of the common downlink control signals, and/or power control to reduce or increase the effective cell radius. Cell shaping can be used to follow traffic variations over a day or week. User Equipment devices (UEs) experience a common, single, semi-static cell.

Cell shaping is a downlink-focused process. Changes are applied to change the coverage of the downlink common channels. The uplink baseband is not considered an issue with traditional cell shaping because digital processing is done in the antenna domain so there is no need to adapt a beam space of possibly lower dimensionality than the number of antennas. Any uplink adaptation to the cell shaping modification can be made directly in the uplink receiver applied on the full dimensionality antenna domain.

Note that cell shaping is a multi-cell coordination process, since the network coverage must be maintained when cell shaping is applied. It is a relatively slow inter-cell coordination process, which can be implemented in a functionally centralized coordination entity or in a distributed way across the cells. It is also worth noting that cell shaping modifications could be desired because of downlink traffic load distribution and/or uplink traffic load distribution.

SUMMARY

Systems and methods relating to adjusting uplink coverage in a cellular communications network are disclosed. In some embodiments, a method of operation of a network node to adjust uplink coverage for one or more cells in a cellular communications network comprises determining that there is a need to adjust uplink beam transformations for one or more cells of a plurality of cells in a cellular communications network. For each cell of the one or more cells, the uplink beam transformation for the cell is a transformation of received uplink signals for the cell from an antenna domain to a beam domain. The method further comprises, upon determining that there is a need to adjust the uplink beam transformations for the one or more cells, determining new uplink beam transformations for the one or more cells and applying the new uplink beam transformations for the one or more cells. In this manner, uplink coverage can be adapted to, e.g., provide matching between uplink and downlink coverage and/or to provide matching between uplink coverage and geographic distribution of uplink traffic.

In some embodiments, determining that there is a need to adjust the uplink beam transformations for the one or more cells comprises evaluating a mismatch between an uplink coverage of the one or more cells and a downlink coverage of the one or more cells and determining that there is a need to adjust the uplink beam transformations for the one or more cells if the mismatch between the uplink coverage of the one or more cells and the downlink coverage of the one or more cells is more than a predefined threshold. Further, in some embodiments, evaluating the mismatch between the uplink coverage of the one or more cells and the downlink coverage of the one or more cells comprises evaluating the mismatch between the uplink coverage of the one or more cells and the downlink coverage of the one or more cells in response to a change in downlink cell shaping for at least one of the one or more cells.

In some embodiments, determining the new uplink beam transformations for the one or more cells comprises determining the new uplink beam transformations for the one or more cells such that the new uplink beam transformations for the one or more cells reduce or minimize the mismatch between the uplink coverage of the one or more cells and the downlink coverage of the one or more cells. Further, in some embodiments, determining the new uplink beam transformations for the one or more cells comprises determining the new uplink beam transformations for the one or more cells from a plurality of predetermined uplink beam transformations such that the new uplink beam transformations are uplink beam transformations from the plurality of predetermined uplink beam transformations that provide a best match between the uplink coverage of the one or more cells and the downlink coverage of the one or more cells.

Further, in some embodiments, the method further comprises, after applying the new uplink beam transformations for the one or more cells determining that a remaining mismatch between the uplink coverage of the one or more cells and the downlink coverage of the one or more cells is greater than a predefined threshold. The method further comprises, upon determining that the remaining mismatch between the uplink coverage of the one or more cells and the downlink coverage of the one or more cells is greater than a predefined threshold, computing second new uplink beam transformations for the one or more cells that reduce or minimize the remaining mismatch between the uplink coverage of the one or more cells and the downlink coverage of the one or more cells, and applying the second new uplink beam transformations for the one or more cells.

In some other embodiments, determining the new uplink beam transformations for the one or more cells comprises computing the new uplink beam transformations for the one or more cells from a plurality of predetermined uplink beam transformations such that the new uplink beam transformations reduce or minimize the mismatch between the uplink coverage of the one or more cells and the downlink coverage of the one or more cells.

In some embodiments, determining that there is a need to adjust the uplink beam transformations for the one or more cells comprises evaluating a mismatch between the uplink coverage of the one or more cells and a geographical distribution of uplink traffic of the one or more cells and determining that there is a need to adjust the uplink beam transformations for the one or more cells if the mismatch between the uplink coverage of the one or more cells and the geographical distribution of uplink traffic of the one or more cells is more than a predefined threshold.

In some embodiments, determining the new uplink beam transformations for the one or more cells comprises determining the new uplink beam transformations for the one or more cells such that the new uplink beam transformations for the one or more cells reduce or minimize the mismatch between the uplink coverage of the one or more cells and the geographical distribution of uplink traffic of the one or more cells. Further, in some embodiments, determining the new uplink beam transformations for the one or more cells comprises determining the new uplink beam transformations for the one or more cells from a plurality of predetermined uplink beam transformations such that the new uplink beam transformations are uplink beam transformations from the plurality of predetermined uplink beam transformations that provide a best match between the uplink coverage of the one or more cells and the geographical distribution of uplink traffic of the one or more cells.

Further, in some embodiments, the method further comprises, after applying the new uplink beam transformations for the one or more cells, determining that a remaining mismatch between the uplink coverage of the one or more cells and the geographical distribution of uplink traffic of the one or more cells is greater than a predefined threshold. The method further comprises, upon determining that the remaining mismatch between the uplink coverage of the one or more cells and the geographical distribution of uplink traffic of the one or more cells is greater than a predefined threshold, computing second new uplink beam transformations for the one or more cells that reduce or minimize the remaining mismatch between the uplink coverage of the one or more cells and the geographical distribution of uplink traffic of the one or more cells and applying the second new uplink beam transformations for the one or more cells.

In some embodiments, determining the new uplink beam transformations for the one or more cells comprises computing the new uplink beam transformations for the one or more cells from a plurality of predetermined uplink beam transformations such that the new uplink beam transformations reduce or minimize the mismatch between the uplink coverage of the one or more cells and the geographical distribution of uplink traffic of the one or more cells.

In some embodiments, the method further comprises evaluating whether there is a need to perform one or more handovers, one or more Coordinated Multi-Point (CoMP) set changes, and/or one or more carrier aggregation configuration changes for the one or more cells and performing one or more handovers, one or more CoMP set changes, and/or one or more carrier aggregation configuration changes for the one or more cells upon determining that there is a need to perform one or more handovers, one or more CoMP set changes, and/or one or more carrier aggregation configuration changes for the one or more cells.

In some embodiments, the network node is a core network node of the cellular communications network. Further, in some embodiments, applying the new uplink beam transformations for the one or more cells comprises configuring the one or more cells to use the new uplink beam transformations when processing uplink signals on the one or more cells.

In some other embodiments, the network node is a radio access node of the cellular communications network, and the one or more cells are one or more cells served by the radio access node. Further, in some embodiments, applying the new uplink beam transformations for the one or more cells comprises applying the new uplink beam transformations locally at the radio access node when processing uplink signals on the one or more cells.

Embodiments of a network node for adjusting uplink coverage for one or more cells in a cellular communications network are also disclosed. In some embodiments, the network node is adapted to perform the method of operation of a network node according to any one of the embodiments disclosed herein.

In some other embodiments, a network node for adjusting uplink coverage for one or more cells in a cellular communications network comprises one or more processors and memory. The memory comprises instructions executable by the one or more processors whereby the network node is operable to perform the method of operation of a network node according to any one of the embodiments disclosed herein.

In some other embodiments, a network node for adjusting uplink coverage for one or more cells in a cellular communications network comprises one or more modules operable to perform the method of operation of a network node according to any one of the embodiments disclosed herein.

Embodiments of a computer program are also disclosed. In some embodiments, the computer program comprises instructions which, when executed on at least one processor, cause the at least one processor to carry out the method of operation of a network node according to any one of the embodiments disclosed herein. Embodiments of a carrier containing the aforementioned computer program are also disclosed, wherein the carrier is one of an electronic signal, an optical signal, a radio signal, or a computer readable storage medium.

BRIEF DESCRIPTION OF THE DRAWINGS

The accompanying drawing figures incorporated in and forming a part of this specification illustrate several aspects of the disclosure, and together with the description serve to explain the principles of the disclosure.

FIG. 3 illustrates an example in which uplink beam transformation is adapted to match the downlink coverage after cell shaping according to some embodiments of the present disclosure;

FIG. 4 illustrates an example in which the uplink coverage of individual cells is modified even if no cell shaping is applied to the downlink common channel of any cell, as long as the total uplink multi-cell coverage still appropriately matches the downlink multi-cell coverage, according to some other embodiments of the present disclosure;

DETAILED DESCRIPTION

Figure 1:
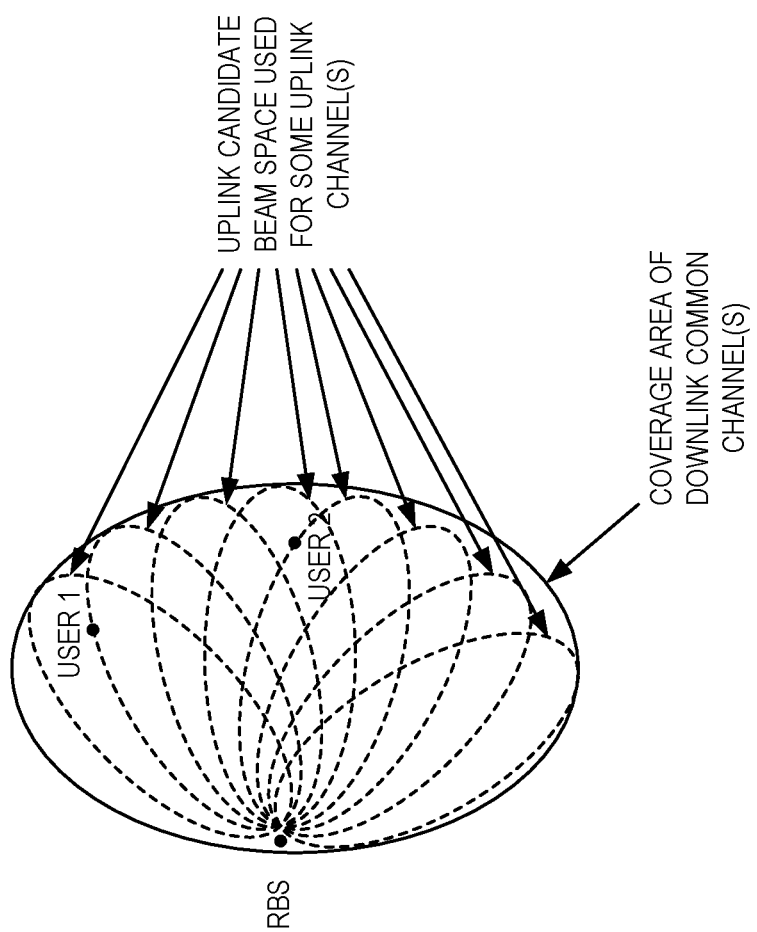
FIG. 1 illustrates beam domain processing in the uplink.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Radio Node: As used herein, a "radio node" is either a radio access node or a wireless device.

Radio Access Node: As used herein, a "radio access node" or "radio network node" is any node in a radio access network of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), and a relay node.

Core Network Node: As used herein, a "core network node" is any type of node in a core network. Some examples of a core network node include, e.g., a Mobility Management Entity (MME), a Packet Data Network Gateway (P-GW), a Service Capability Exposure Function (SCEF), or the like.

Wireless Device: As used herein, a "wireless device" is any type of device that has access to (i.e., is served by) a cellular communications network by wirelessly transmitting and/or receiving signals to a radio access node(s). Some examples of a wireless device include, but are not limited to, a User Equipment device (UE) in a 3GPP network and a Machine Type Communication (MTC) device.

Network Node: As used herein, a "network node" is any node that is either part of the radio access network or the core network of a cellular communications network/system.

Antenna Domain (or Antenna-Space Domain) and Beam Domain (or Beam-Space Domain): The signals transmitted or received from/at an array of antennas at a given time can be represented as an array of values. The size of this array is equal to the number of antennas. The basis of a domain is a minimum-size set of elements which can be combined to span the full space in which we are working. So, in the antenna domain, the base is simply the signals at all antenna elements. Mathematical manipulations can be applied to the array representing the values of the signals at the antennas, and when such manipulations are made, the manipulations are said to be in the antenna domain.

Now, one of those mathematical manipulations can be a basis transformation. The basis transformation would transform from one domain to another domain. To be able to cover the full initial antenna-domain space, the full dimensionality size would need to be maintained. So the size of the initial antenna domain and the size of the transformed domain would remain the same, i.e. the number of antennas. Still, if the basis transformation is devised so that certain elements of the new basis are likely to dominate other elements in amplitude, one can apply a dimensionality reduction manipulation, either after the basis transformation or as a part of the basis transformation. The dimensionality reduction simply consists in throwing away some elements of the array in the transformed domain. The discarded elements correspond to the transformed-domain basis elements which are likely to correspond to the lowest amplitude elements. In this document, we refer to this reduced dimensionality space as the beam domain.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell;" however, particularly with respect to 5G NR concepts, beams may be used instead of cells and, as such, it is important to note that the concepts described herein are equally applicable to both cells and beams.

Before discussing embodiments of the present disclosure, a discussion of a problem that arises when using advanced antenna system is provided. With advanced antenna systems for which a basis transformation from the antenna domain to a reduced dimensionality beam domain is made, using a pre-established semi-static transformation, in the uplink reception chain, any cell shaping would need to consider the fact that the beam space coverage in the uplink must match the modified coverage of the downlink common channels after cell shaping. FIG. 1 illustrates beam domain processing in the uplink. There is a need to match the coverage of the uplink beam space and the coverage of the downlink common channels. If one uses cell shaping, i.e. modifies the coverage of the downlink common control signals, without modifying the uplink transformation from antenna space to beam space, the uplink coverage could no longer match the downlink cell shape, which would result in suboptimal coverage of the geographical network area (e.g., reduced throughput for users and reduced network coverage).

Figure 2:
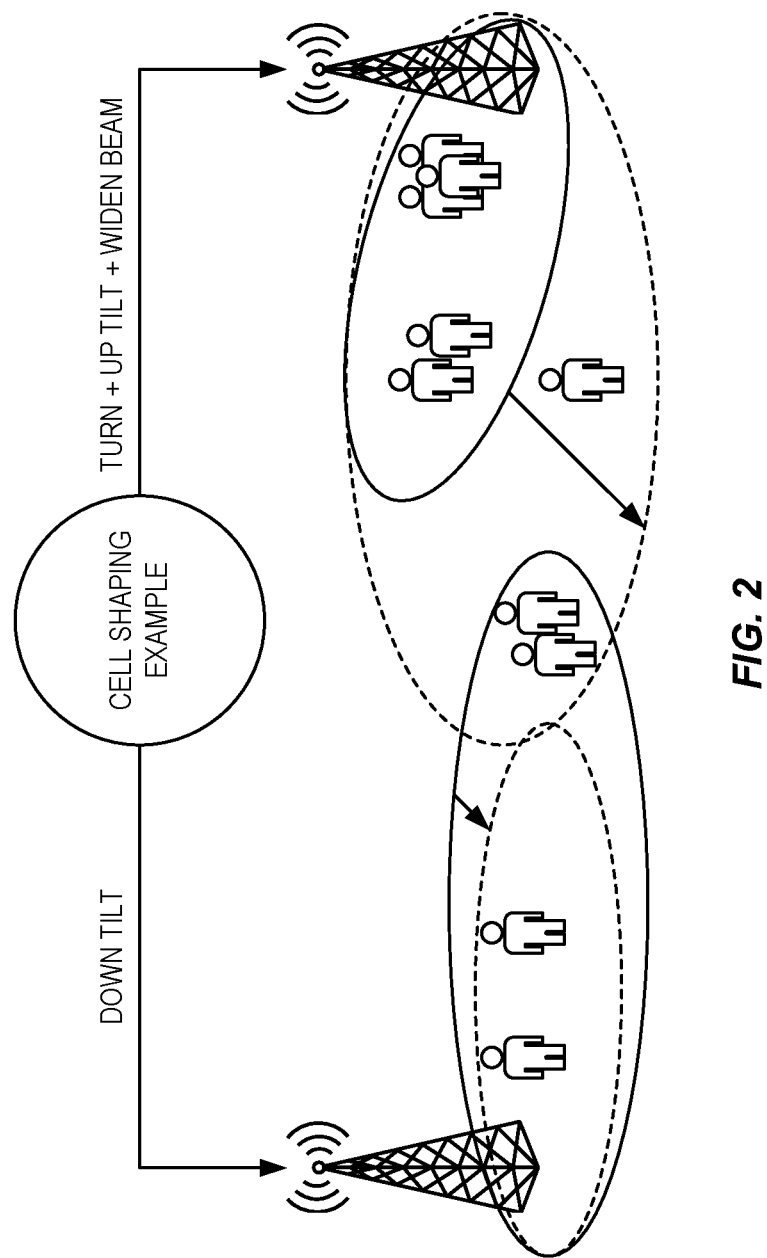
FIG. 2 illustrates traditional cell shaping, i.e., modification of the coverage of the common downlink control signals.

Embodiments of the present disclosure link cell shapes, as defined by the coverage of the downlink common control signals, to specific antenna to beam transformation used for some uplink channels, so that the uplink coverage and the downlink coverage matches irrespectively of the cell shaping. FIG. 2 illustrates traditional cell shaping, i.e. modification of the coverage of the common downlink control signals. In the illustrated example, downlink cell shaping is coordinated to provide network coverage. In particular, for the cell on the left-hand side of FIG. 2, cell shaping results in a reduction in the downlink coverage of the cell. In order to maintain network coverage, cell shaping is also applied to increase the coverage of the cell on the right-hand side of FIG. 2. If the illustrated cell shaping is used without modifying the uplink transformation from antenna space to beam space, then the uplink coverage would no longer match the downlink cell shape, which would result in suboptimal coverage and performance.

FIG. 3 illustrates an example in which uplink beam transformation is adapted to match the downlink coverage after cell shaping according to some embodiments of the present disclosure. The top of FIG. 3 illustrates the same cell shaping as described above with respect to FIG. 2. The lower part of FIG. 3 illustrates a change in the uplink beam transformations for the two cells such that the uplink coverage of the cells match the downlink coverage of the cells. Specifically, in this example, the uplink beam domain includes only two beams for simplicity. For the cell on the left-hand side of FIG. 3, the uplink beam transformation, which may include uplink power control, for the cell is changed such that the uplink coverage matches the downlink coverage of that cell after downlink cell shaping. Likewise, for the cell on the left-hand side of FIG. 3, the uplink beam transformation, which again may include uplink power control, for the cell is changed such that the uplink coverage matches the downlink coverage of that cell after downlink cell shaping.

Note that although some embodiments are described in the context of cell coverage where the objective is to keep a match between the uplink and the downlink coverage of a particular cell, the same concept can be applied at the network level instead of the cell level. That is, one could modify the uplink coverage of multiple cells such that the overall multi-cell uplink coverage keeps a good match to the downlink coverage of those same multiple cells when cell shaping is applied on the downlink common channels of those multiple cells. Maintaining a multi-cell coverage match between uplink and downlink might be sufficient, instead of cellular-level matching, when, for example, Coordinated Multipoint (CoMP) processing is used.

In some embodiments, the uplink coverage of individual cells is modified even if no cell shaping is applied to the downlink common channel of any cell, as long as the total uplink multi-cell coverage is still appropriately matching the downlink multi-cell coverage. FIG. 4 illustrates this concept. In particular, the top part of FIG. 4 illustrates a scenario in which there is no modification to the downlink coverage (i.e., there is no modification to the coverage of the downlink common channel of any cell). The lower part of FIG. 4 illustrates that, for these same cells, the uplink beam transformations for two of the cells are changed in order to better match the geographical distribution of uplink traffic while maintaining the match between the uplink and downlink coverage.

While not being limited to or by any particular advantage, embodiments of the present disclosure provide the following advantages. If one wants to benefit both from dimensionality reduction in uplink using a semi-static antenna-space to beam-space transformation and from cell shaping adaptation, a mechanism is needed to couple modifications of the coverage in the downlink common channels to adequate uplink antenna-space to beam-space transformations in order to match the coverage in downlink and uplink. Otherwise the network throughput and coverage would suffer.

Figure 5:
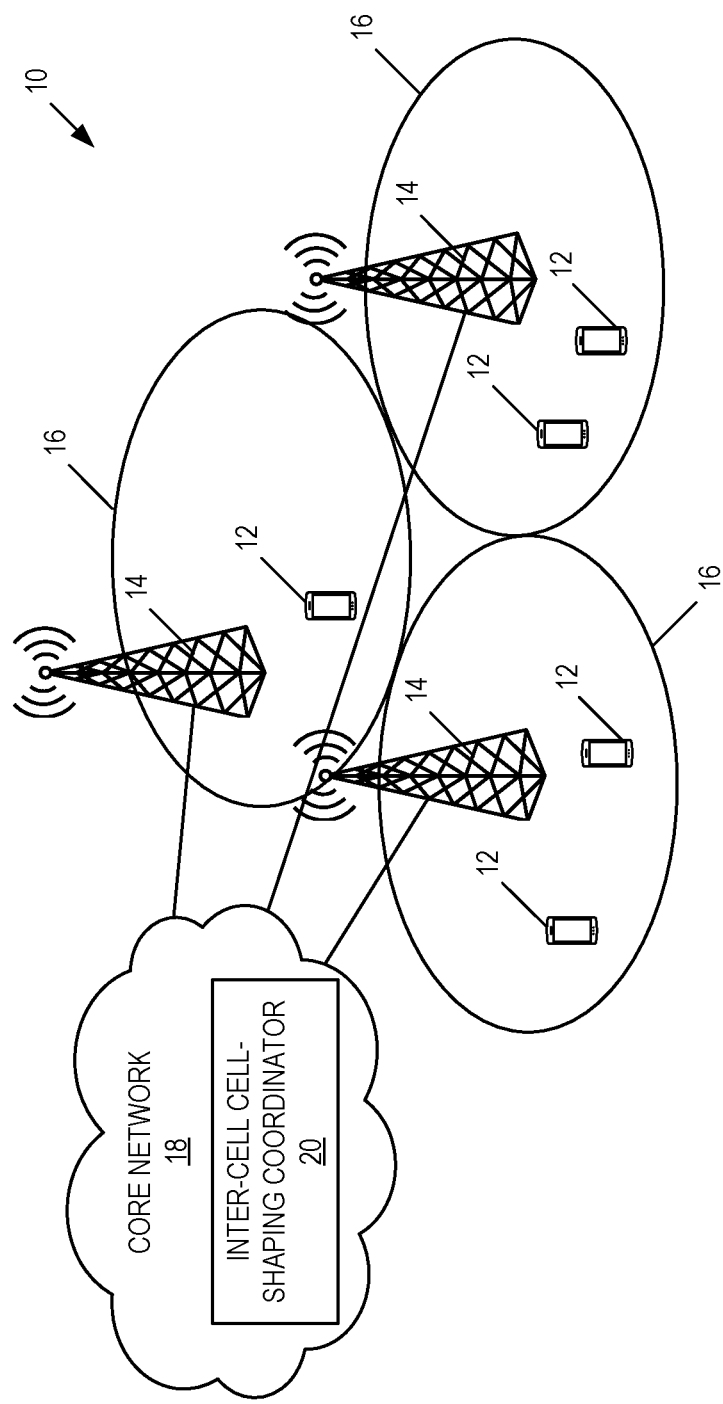
FIG. 5 illustrates one example of a cellular communications network in which embodiments of the present disclosure may be implemented.

FIG. 5 illustrates one example of a cellular communications network 10 in which embodiments of the present disclosure may be implemented. As illustrated, a number of wireless devices 12 (e.g., UEs) wirelessly transmit signals to and receive signals from radio access nodes 14 (e.g., eNBs or gNBs, which are 5G NR base stations), each serving one or more cells 16. The radio access nodes 14 are connected to a core network 18. In some embodiments, an inter-cell cell-shaping coordinator 20 is implemented in the core network 18. The inter-cell cell-shaping coordinator 20 operates to coordinate downlink cell shaping for the cells 16.

Figure 6:
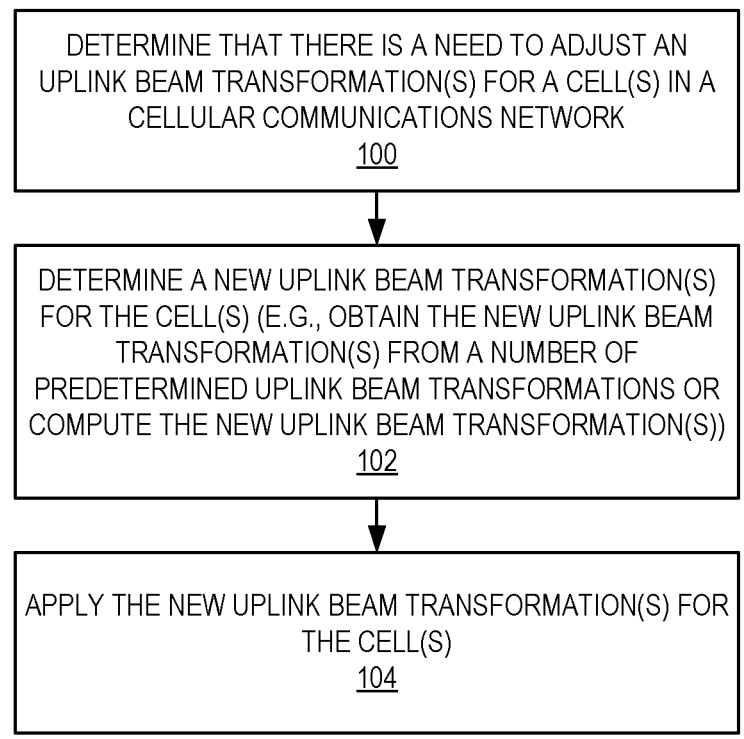
FIG. 6 illustrates the operation of a network node (e.g., a radio access node or a core network node) according to some embodiments of the present disclosure.

FIG. 6 illustrates the operation of a network node (e.g., a radio access node 14 or a core network node) according to some embodiments of the present disclosure. As illustrated, the network node determines that there is a need to adjust an uplink beam transformation(s) for a cell(s) 16 in the cellular communications network 10 (step 100). In some embodiments, the network node determines that there is a need to adjust the uplink beam transformation(s) for the cell(s) 16 if a change in cell-shaping has been or is to be applied for the cell(s) 16 that would result in a mismatch between uplink and downlink coverage (i.e., a mismatch that is greater than a predefined mismatch threshold). In some other embodiments, the network node determines that there is a need to adjust the uplink beam transformation(s) for the cell(s) 16 based on a geographic distribution of uplink traffic in the cell(s) 16.

Upon determining that there is a need to adjust the uplink beam transformation(s) of the cell(s) 16, the network node determines a new uplink beam transformation(s) for the cell(s) 16 (step 102). The new uplink beam transformation(s) may be obtained from a number of predetermined and stored uplink beam transformations or computed, depending on the particular embodiment. In some embodiments, the new uplink beam transformation(s) are determined such that the uplink-downlink coverage mismatch is minimized or reduced to an acceptable level (e.g., as defined by a predefined or preconfigured mismatch threshold). In some other embodiments, the new uplink beam transformation(s) are determined based on a geographic distribution of uplink traffic (e.g., to match the uplink beams to the directions from which the most uplink traffic is being or is expected to be received).

The network node applies the new uplink transformation(s) for the cell(s) 16 (step 104). In some embodiments, the network node is a core network node, and the core network node applies the new uplink beam transformation(s) by signaling the new uplink beam transformation(s) or an indication(s) of the new uplink beam transformation(s) to the appropriate radio access node(s) 14. In some other embodiments, the network node is the radio access node 14 serving the cell(s) 14, and the radio access node 14 applies the new uplink beam transformation(s) locally at the radio access node 14 when processing uplink signals.

In some embodiments, when a cell shaping of the downlink common channel(s) is made, i.e. a change in the downlink common channel for one or more of the cells 16 is triggered, an evaluation of a mismatch between the resulting downlink coverage and the existing uplink coverage of the cell(s) 16 (referred to herein as the uplink-downlink coverage mismatch) is performed. The uplink-downlink coverage mismatch may be performed only for those cells for which the downlink cell-shaping was performed (e.g., separately for each cell) or may be performed for the sector-carrier. The uplink-downlink mismatch is evaluated taking into consideration the presently used uplink transformation from the antenna domain to the beam domain for the uplink channel(s) of interest. In some embodiments, if a coverage mismatch is identified, a number of pre-computed and stored alternative uplink beam transformations are evaluated to find the one that provides an acceptable match between the uplink and downlink coverage. If an uplink beam transformation that provides an acceptable match between the uplink and downlink coverage does exist, then this uplink transformation would be designated as the one to use following the cell shaping modification. Conversely, if no pre-computed and stored uplink transformation would result in an acceptable coverage match, a new acceptable transformation is computed, which would be identified as the one to use following cell shaping and also stored for future referencing in the database of pre-computed uplink transformations.

According to some embodiments, a basic set of spatial orthonormal functions are populated at each cell 16. Each function, for example, represents a set of directions. Here the directions or directional beams in general, are described by two angles; azimuth and elevation. Based on the downlink cell coverage, a subset of orthonormal functions is determined to perform the uplink beamforming for the reception of traffic and control channels. The determined subset is determined to, e.g., provide an acceptable level of matching between the downlink coverage and uplink coverage. The selected subset may further be reduced to a smaller number of functions by combining some of the orthonormal functions together to reduce computational complexity in the receiver. The size of the basic set depends on the dimensionality of the antenna array.

Figure 7:
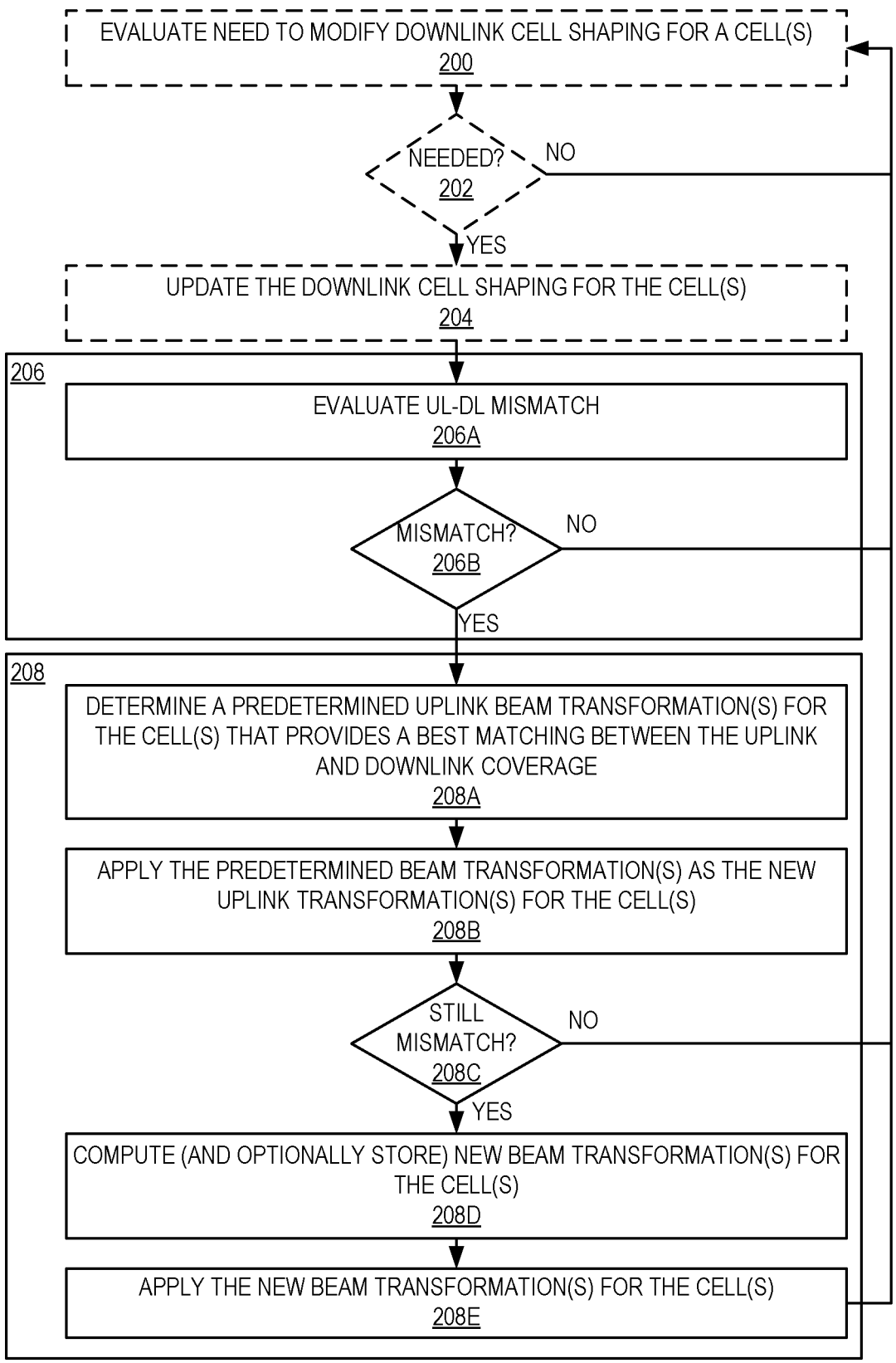
FIG. 7 illustrates the operation of a network node (e.g., a radio access node or a core network node) to adapt uplink beam transformation(s) in response to a change in downlink cell-shaping according to some embodiments of the present disclosure.

FIG. 7 illustrates the operation of a network node (e.g., a radio access node 14 or a core network node) to adapt uplink beam transformation(s) in response to a change in downlink cell-shaping according to some embodiments of the present disclosure. This process is a more detailed version of the process of FIG. 6, according to some embodiments. Note that optional steps are illustrated with dashed lines. In this embodiment, the network node evaluates the need to modify downlink cell shaping for a cell(s) 16 (step 200).

The evaluation to establish if there is a need to modify the downlink cell shaping (i.e., the need to change the coverage of the downlink common channels) involves inter-cell coordination to jointly consider the load balancing aspects and the aspects related to the quality of the links from the wireless devices 12 to the various sector carriers. Cell shaping can result in the handover of certain wireless devices 12 and/or change in carrier aggregation secondary sector carriers and, therefore, needs to be made considering both uplink and downlink traffic load and link quality on all sector carriers. Cell shaping can also have an impact on Multi-User Multiple Input Multiple Output (MU-MIMO) pairing opportunities, which should therefore also be considered. The criteria to optimize cell shaping include any combination of multi-cell throughput, wireless device throughput for certain traffic streams, power efficiency, and battery lifetime of wireless devices, under certain link retainability and geographical service availability constraints.

The evaluation of the need to modify the downlink cell shaping can use multiple measurements made on the radio access node side and/or measurements made on the wireless device side and reported to the radio access node 14. As an example, in LTE, the following triggered UE measurement reports, specified in 3GPP Technical Specification (TS) 36.331, could be used:

A1—Serving becomes better than threshold;
A2—Serving becomes worse than threshold;
A3—Neighbor becomes offset better than Primary Cell (PCell);
A4—Neighbor becomes better than threshold;
A5—PCell becomes worse than threshold1 and neighbor becomes better than threshold2;
A6—Neighbor becomes offset better than Secondary Cell (SCell);
C1—Channel State Information Reference Signal (CSI-RS) resource becomes better than threshold;
C2—CSI-RS resource becomes offset better than reference CSI-RS resource;
B1—Inter Radio Access Technology (RAT) neighbor becomes better than threshold;
B2—PCell becomes worse than threshold1 and inter RAT neighbor becomes better than threshold2.

The radio access node 14 can also use other information reported by the wireless device 12 such as, e.g., the Buffer Status Report (BSR) and/or the Power Headroom Report (PHR). As a simple example, a downlink load imbalance could be identified based on Physical Resource Block (PRB) utilization and Transmit Time Interval (TTI) utilization in two adjacent cells 16, one cell 16 having a very low load and the neighbor cell 16 being highly loaded. Certain wireless devices 12 in the heavily loaded cell 16 could report an A4 message in relation to the lightly loaded neighbor cell 16. Based on that A4 measurement, a desire to extend the lightly loaded cell 16 in the direction of the heavily loaded cell 16 would be identified.

Evaluating the need for a change in downlink cell shaping (i.e., the need for change in downlink coverage) may, for example, involve analyzing various UE measurement reports such as, Reference Signal Received Power (RSRP), Reference Signal Received Quality (RSRQ), Time Difference of Arrival (TDOA), etc. from the connected wireless devices 12. These measurements can be used by the network node(s) (e.g., the radio access nodes 14) to identify the location (or direction) of the connected wireless device population within the existing cell coverage area. The location of the wireless devices 12 can be found by RSRP/RSRQ/TDOA reports with respect to different serving network nodes and neighboring network nodes. With the knowledge of location of the radio access nodes 14 and the electrical distance derived from the measurement reports, the location of the wireless device population within the network coverage area can be determined. When the wireless device 12 population is determined to be concentrated in a subset of the total coverage, the downlink cell shaping (i.e., the beamforming coverage for the downlink common channels) can be adjusted. This will make sure that the broadcast beams reach the wireless device population with less transmit power (lesser compared to covering the full coverage area), thereby increasing the network efficiency.

In another scenario, evaluating the need for a change in downlink cell shaping (i.e., in downlink coverage) may, for example, be triggered by an adjustment in the downlink coverage of a neighbor network node(s). In this scenario, the network node may have to modify the downlink coverage for increasing the reach of the cell(s) 16 such that the network can cover the designated area. In yet another scenario, evaluating the need for a change in downlink coverage may, for example, be triggered by an uneven geographical distribution of wireless device population within the designated coverage area.

In such situations, full transmit power can be preserved with the modified beam shape, but increasing the reach. The increased reach scenario is preferred when there is an increased load in a neighboring network node. By increasing the reach, the wireless device load can be shared by the network nodes efficiently, further reducing dropped calls.

If there is no need to modify the downlink cell shaping (step 202, NO), the process returns to step 200. If there is a need to modify the downlink cell shaping (step 202, YES), the network node updates the downlink cell shaping for the cell(s) 16 (step 204).

The network node then determines whether uplink beam transformations for a cell(s) 16 needs to be adjusted as a result of, e.g., the change in downlink cell shaping (step 206). More specifically, in the example embodiment of FIG. 7, the network node evaluates the uplink-downlink mismatch (step 206A). The evaluation of the mismatch between the uplink and downlink coverage is based on the current uplink beam transformation(s) used for the cell(s) 16 and the downlink cell-shaping. The evaluation of the uplink-downlink mismatch may also be based on measurements and modeling of the uplink and downlink coverage based on those measurements. Machine-learning approaches can be used to map, for example, timing advance, RSRP, or other information, to the predicted link quality on other sector carriers. The average load on certain frequency ranges of certain sector carriers can also be used in the mapping from the measurements to the predicted coverage. The coverage must be evaluated for all physical channels which use the devised beams. This definition of coverage is associated with criteria defining what is acceptable for a given physical channel. An example of such criteria could be the probability of false or missed detection for a random access channel, or the minimum acceptable throughput for a shared data channel at the cell edge.

Once the uplink-downlink mismatch is evaluated (i.e., determined), the network node determines whether there is a mismatch (step 206B). In other words, the network node determines whether the uplink-downlink mismatch is greater than a predefined or preconfigured acceptable level. If not, the uplink beam transformation(s) of the cell(s) 16 do not need to be adjusted, and the process returns to step 200. However, if the uplink-downlink mismatch is greater than the predefined or preconfigured acceptable level, the network node then determines a new uplink beam transformation(s) for the cell(s) 16 and applies the new uplink beam transformation(s) (step 208). Note that step 208 corresponds to steps 102 and 104 of FIG. 6.

More specifically, in the example of FIG. 7, the network node determines a predetermined uplink beam transformation(s) for the cell(s) 16 that provides a best matching between the uplink and downlink coverage (step 208A). More specifically, multiple predefined uplink beam transformations are stored. The network node selects the uplink beam transformation(s) from the set of predefined uplink beam transformations that provide the best matching between the uplink and downlink coverage. Note that, in practice, the set of predefined uplink transformations could be paired a priori, by the person who manually populated the database, with some of the beamforming transformation defining the downlink coverage such that the uplink beam transformation(s) that provide the best matching provided a given downlink transformation are specified in advance. When such a pre-established pairing is present, the overall process is greatly simplified.

The network node then applies the predetermined beam transformation(s) at the new uplink beam transformation(s) for the cell(s) 16, as discussed above with respect to step 104 of FIG. 6 (step 208B). After applying the new uplink beam transformation(s) for the cell(s) 16, the network node determines whether the remaining uplink-downlink mismatch is still greater than a predefined or preconfigured acceptable level (step 208C). If not, no further adjustment of the uplink beam transformation(s) is needed, and the process returns to step 200. If the remaining uplink-downlink mismatch is still greater than the predefined or preconfigured acceptable level, the network node computes a new uplink beam transformation(s) for the cell(s) 16 and optionally stores the new uplink beam transformation(s) as additions to the set of predefined uplink beam transformations (step 208D). While details for an example process for computing the new uplink beam transformation(s) is provided below, multiple approaches can be used. As an example, one approach is to take an existing uplink beam transformation, apply the most appropriate matrix rotation in Three Dimensions (3D) to it, and possibly throw away some of the resulting beams which fall outside the intended coverage region. Note that while step 208 includes both steps 208A and 208D in this example, step 208 may alternatively include steps 208A and 208B but not steps 208C through 208E or alternatively include steps 208D and 208E but not steps 208A through 208C. The network node then applies the computed, new uplink beam transformation(s) for the cell(s) 16, as discussed above with respect to step 104 of FIG. 6 (step 208E).

Regarding steps 100 and 102 of FIG. 6 and steps 206, 208A, and 208D of FIG. 7, the following example illustrates one approach for evaluating the uplink-downlink mismatch and determining and/or computing the new uplink beam transformation(s) for the cell(s) 16 that minimizes the uplink-downlink mismatch or at least reduces the uplink-downlink mismatch to an acceptable level.

In general, in this example, the uplink coverage (i.e., the uplink beam transformation(s)) will be adjusted such that it matches with the downlink coverage. A set of N spatial functions, $f_i(\phi,\theta)$, i=0, 1, ..., N−1 can be predefined, where $\phi$ and $\theta$ represent the azimuth and elevation angles, respectively. These functions may be orthogonal to each other, i.e. $\langle f_i(\phi,\theta), f_j(\phi,\theta) \rangle = 0$ for i≠j ($\langle \ \rangle$ represents inner product). A plurality of uplink beams, e.g. L uplink beams can be formed to match the downlink coverage as follows:

$$C(U(\phi,\theta), D(\phi,\theta)) < \epsilon$$

where $U(\phi,\theta)$ and $D(\phi,\theta)$ represent the uplink radiation pattern and downlink radiation pattern, respectively. $U(\phi,\theta)$ and $D(\phi,\theta)$ may be normalized to such that the total radiated power in the DL link and received UL power is unity or a predefined power levels for DL and UL (can be different for DL and UL). In another example, $U(\phi,\theta)$ and $D(\phi,\theta)$ are signal to interference plus noise ratios (SINRs), throughput estimates on the UL and DL respectively. $C(x,y)$ is a cost function measuring a similarity or degree of matching between of functions x and y. For example, $C(x,y)=\|x-y\|$. The parameter E defines the tightness of the similarity (i.e., a predefined acceptable level of uplink-downlink matching). For large antenna arrays, E can be smaller, i.e. much tighter match between the UL and DL coverage can be achieved. In general, the tightness parameter E is a function of antenna array dimension.

The uplink radiation pattern can be constructed as a weighted sum of L beams as follows (L≤N):

$$U(\phi, \theta) = \sum_{\ell=0}^{L-1} p_\ell g_\ell(\phi, \theta)$$

The set of weights $\{p_l\}$ are defined based on the coverage requirements for different beams. For example, for certain elevation and/or azimuth angles, strong reflectors should be avoided to reduce reflections or diffractions (e.g., at high frequencies) or to reduce interference to other cells or reduce radiation towards certain directions due to regulatory restrictions, etc. The individual uplink beams can be obtained by a linear combination of the orthonormal functions.

$$g_\ell(\phi, \theta) = \sum_{k=0}^{N-1} w_{k\ell} f_k(\phi, \theta)$$

Figure 8:
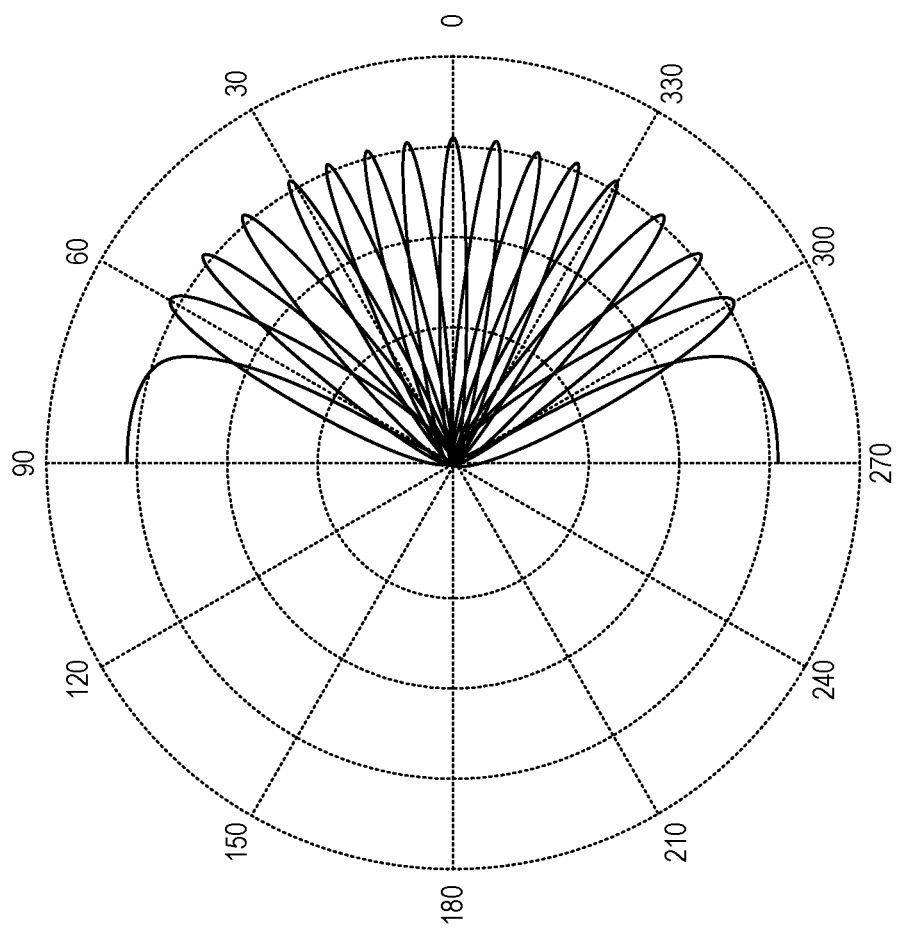
FIG. 8 illustrates an example in which the set of spatial functions, $f_k(\phi,\theta)$, is a set of Discrete Fourier Transform (DFT)

A simple example of $f_k(\phi,\theta)$ are the DFT beams as shown in FIG. 8.

In some embodiments, the set of weights $\{w_{kl}\}$ are adapted such that the similarity cost function C is less than E. In some other embodiments, the set of weights $\{p_l\}$ are adapted such that the similarity cost function C is less than E. In some other embodiments, both the set of weights $\{w_{kl}\}$ and the set of weights $\{p_l\}$ are adapted such that the similarity cost function C is less than $\epsilon$.

To reduce the computational complexity, predefined weight sets can be configured to match a given set of downlink coverage scenarios. These predefined weight sets define the set of predefined uplink beam transformations used in, e.g., step 208A of FIG. 7. If these sets are found to be unsatisfactory (e.g., in step 208C of FIG. 7), a new set(s) of weights can be determined that provide a similarity cost function C that is less than E.

Figure 9:
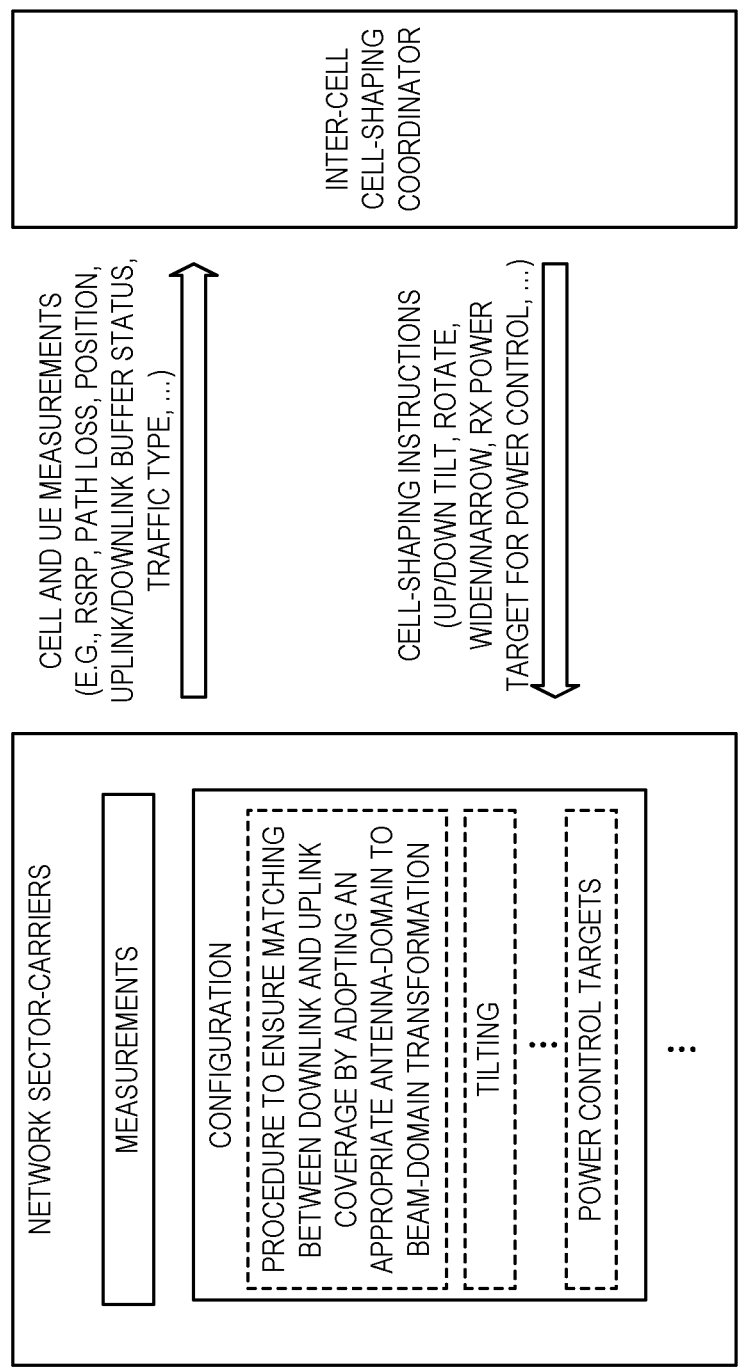
FIG. 9 is a block diagram that illustrates aspects of some embodiments of the present disclosure.

FIG. 9 is a block diagram that illustrates aspects of some embodiments of the present disclosure. As illustrated, the inter-cell cell-shaping coordinator 20 receives cell and wireless device (e.g., UE) measurements. Based on this information, the inter-cell cell-shaping coordinator 20 determines the desired downlink cell shaping and sends corresponding instructions to the radio access node(s) 14 serving the respective cell(s) 16. Notably, in FIG. 9, the "network sector-carriers" block represents one or more radio access nodes 14 serving corresponding cells 16 operating on respective carriers (i.e., sector-carriers). In this example, the radio access node(s) 14 perform a procedure to ensure matching between downlink and uplink coverage by adopting an appropriate uplink beam transformation (i.e., an appropriate antenna-domain to beam-domain transformation for the uplink), as discussed above.

In some embodiments of the process described above with respect to FIG. 7, the adaption of the uplink beam transformation is performed independently for each cell 16 when there is a change in downlink coverage of the cellular communications network 10 or a multi-cell cluster within the cellular communications network 10. In some embodiments, this adaptation uses coordination among the cells 16 within the cellular communications network 10, specifically, the wireless device specific uplink/downlink throughput as a function of geographical location. More specifically, it is possible to estimate the downlink and uplink spectral efficiency that a wireless device 12 would experience at different geographical locations with different downlink and uplink radiation patterns. Accordingly, with knowledge off the geographical distribution of wireless devices 12, one can try to optimize the uplink and downlink radiation pattern to maximize the expected value of a given metric. The metric could be, for example, the cell throughput given proper radio resource allocation, or the probability of meeting the quality of service requirements for certain data flows.

In some other embodiments, the network node adapts the uplink beam transformation(s) of a cell(s) 16 based on a geographical distribution of uplink traffic. In other words, the uplink coverage across multiple cells 16 can be adapted even if there is no change in the downlink coverage of the cellular communications network 10 or a corresponding multi-cell cluster (i.e., a cluster of two or more cells). The uplink coverage is modified to match changes in the geographical density of the uplink traffic. For these embodiments, a wireless device 12 may be connected to multiple cells, e.g. one for uplink and another for downlink; or a cellular cluster for both downlink and uplink. In such situations, the uplink coverage of one cell 16 may not change in accordance with the downlink coverage change of that cell 16, but may change in accordance with the uplink throughput that can be achieved via other cells 16 within the cellular communications network 10.

Figure 10:
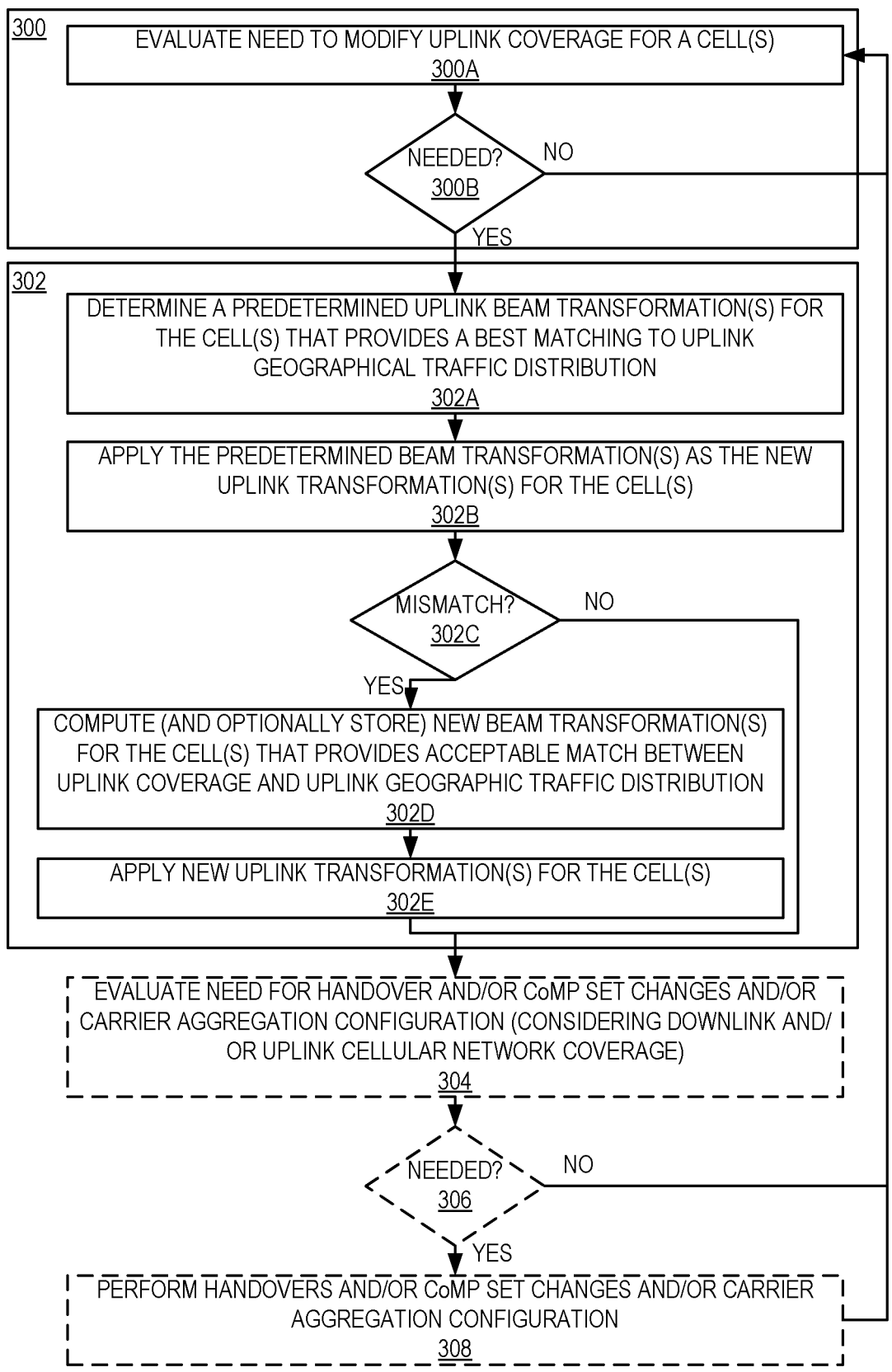
FIG. 10 illustrates one example of a process performed by a network node for changing the uplink beam transformation(s) of a cell(s) given the geographic, or spatial, distribution of the uplink traffic according to some embodiments of the present disclosure.

In this regard, FIG. 10 illustrates one example of a process performed by a network node for changing the uplink beam transformation(s) of a cell(s) 16 given the geographic, or spatial, distribution of the uplink traffic. Any downlink cell shaping could then be done in a separate process based on the downlink traffic distribution and possibility for effective cooperation between cells 16 involved in the downlink and uplink of a wireless device 12. Notably, step 300 of FIG. 10 corresponds to one example of step 100 of FIG. 6, and step 302 of FIG. 10 corresponds to one example of steps 102 and 104 of FIG. 6. Again, optional steps are illustrated with dashed lines.

As illustrated, the network node determines that there is a need to modify an uplink beam transformation(s) for a cell(s) 16 (step 300). More specifically, the network node evaluates the need to modify the uplink coverage (i.e., the uplink beam transformation(s)) for the cell(s) 16 (step 300A). In this example, the evaluation is based on actual or expected geographical distribution of uplink traffic. Expected geographical distribution of uplink traffic may be based on, e.g., historical information (e.g., the actual geographical distribution of uplink traffic for similar dates and/or times of the day). The actual geographical distribution of uplink traffic may be based on information such as, e.g., PRB utilization and/or TTI utilization in the cell(s) 16. Based on the evaluation, the network node determines whether modification of the uplink coverage is needed (step 300B). If not needed, the process returns to step 300A.

However, if needed, the network node then determines a new uplink beam transformation(s) for the cell(s) 16 and applies the new uplink beam transformation(s) (step 302). In this embodiment, the new uplink beam transformation(s) provides an acceptable level of matching between uplink coverage and the (actual or expected) geographical distribution of uplink traffic.

More specifically, in the example of FIG. 10, the network node determines a predetermined uplink beam transformation(s) for the cell(s) 16 that provides a best matching between the uplink coverage and the geographic distribution of uplink traffic (step 302A). More specifically, multiple predefined uplink beam transformations are stored. The network node selects the uplink beam transformation(s) from the set of predefined uplink beam transformations that provide the best matching between the uplink coverage and the geographic distribution of uplink traffic. Note that, in practice, the set of predefined uplink transformations could be paired a priori, by the person who manually populated the database, with different geographic distributions of uplink traffic such that the uplink beam transformation(s) that provide the best match provided a given geographic distribution of uplink traffic are specified in advance. When such a pre-established pairing is present, the overall process is greatly simplified.

The network node then applies the predetermined beam transformation(s) at the new uplink beam transformation(s) for the cell(s) 16, as discussed above with respect to step 104 of FIG. 6 (step 302B). After applying the new uplink beam transformation(s) for the cell(s) 16, the network node determines whether the remaining mismatch between the uplink coverage and the geographic distribution of uplink traffic is still greater than a predefined or preconfigured acceptable level (step 302C). If not, no further adjustment of the uplink beam transformation(s) is needed, and the process proceeds to step 304. If the remaining mismatch is still greater than the predefined or preconfigured acceptable level, the network node computes a new uplink beam transformation(s) for the cell(s) 16 and optionally stores the new uplink beam transformation(s) as additions to the set of predefined uplink beam transformations (step 302D). The new uplink beam transformation(s) is computed such that the mismatch between the uplink coverage and the geographic distribution of uplink traffic is reduced to a predefined or preconfigured acceptable level. Note that while step 302 includes both steps 302A and 302D in this example, step 302 may alternatively include steps 302A and 302B but not steps 302C through 302E or alternatively include steps 302D and 302E but not steps 302A through 302C. The network node then applies the computed, new uplink beam transformation(s) for the cell(s) 16, as discussed above with respect to step 104 of FIG. 6 (step 302E).

Optionally, after the adjustments are applied, the network node evaluates the need for handover and/or CoMP set changes and/or carrier aggregation configuration considering downlink and/or uplink cellular network coverage (step 304). If any of these actions are needed (step 306, YES), the network node performs those actions (or causes them to be performed) (step 308) and the process then returns to step 300. If none of these actions need to be performed (step 306, NO), the process returns to step 300.

Figure 11:
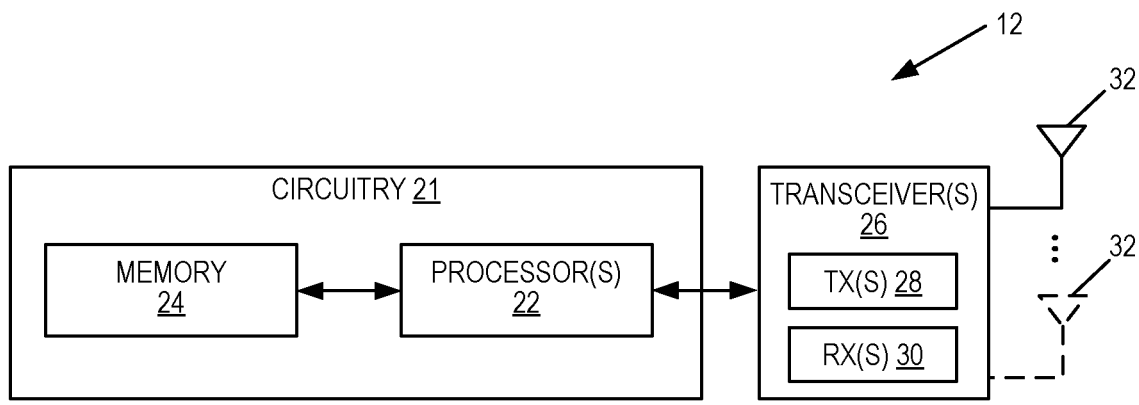
FIGS. 11 and 12 illustrate example embodiments of a wireless device.

FIG. 11 is a schematic block diagram of the wireless device 12 (e.g., UE) according to some embodiments of the present disclosure. As illustrated, the wireless device 12 includes circuitry 21 comprising one or more processors 22 (e.g., Central Processing Units (CPUs), Application Specific Integrated Circuits (ASICs), Field Programmable Gate Arrays (FPGAs), Digital Signal Processors (DSPs), and/or the like) and memory 24. The wireless device 12 also includes one or more transceivers 26 each including one or more transmitters 28 and one or more receivers 30 coupled to one or more antennas 32. In some embodiments, the functionality of the wireless device 12 described above may be implemented in hardware (e.g., via hardware within the circuitry 21 and/or within the processor(s) 22) or be implemented in a combination of hardware and software (e.g., fully or partially implemented in software that is, e.g., stored in the memory 24 and executed by the processor(s) 22).

In some embodiments, a computer program including instructions which, when executed by the at least one processor 22, causes the at least one processor 22 to carry out at least some of the functionality of the wireless device 12 according to any of the embodiments described herein is provided. In some embodiments, a carrier containing the aforementioned computer program product is provided. The carrier is one of an electronic signal, an optical signal, a radio signal, or a computer readable storage medium (e.g., a non-transitory computer readable medium such as memory).

Figure 12:
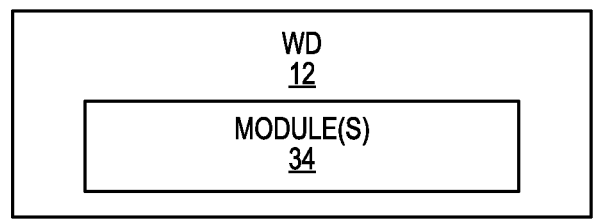

FIG. 12 is a schematic block diagram of the wireless device 12 (e.g., UE) according to some other embodiments of the present disclosure. The wireless device 12 includes one or more modules 34, each of which is implemented in software. The module(s) 34 provide the functionality of the wireless device 12 described herein.

Figure 13:
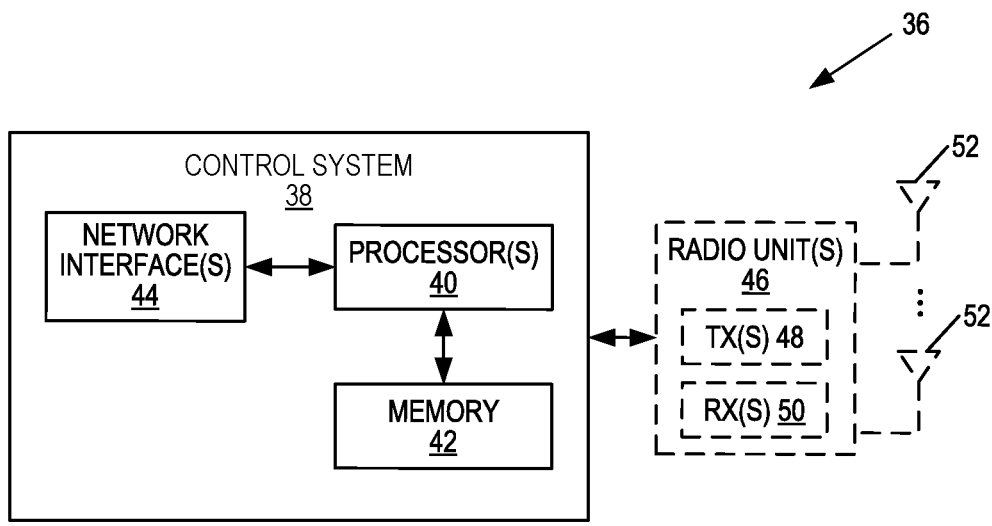
FIGS. 13 through 15 illustrate example embodiments of a network node.

FIG. 13 is a schematic block diagram of a network node 36 (e.g., a radio access node 14 such as, for example, an eNB or gNB or a core network node) according to some embodiments of the present disclosure. As illustrated, the network node 36 includes a control system 38 that includes circuitry comprising one or more processors 40 (e.g., CPUs, ASICs, DSPs, FPGAs, and/or the like) and memory 42. The control system 38 also includes a network interface 44. In embodiments in which the network node 36 is a radio access node 14, the network node 36 also includes one or more radio units 46 that each include one or more transmitters 48 and one or more receivers 50 coupled to one or more antennas 52. In some embodiments, the functionality of the network node 36 described above may be fully or partially implemented in software that is, e.g., stored in the memory 42 and executed by the processor(s) 40.

Figure 14:
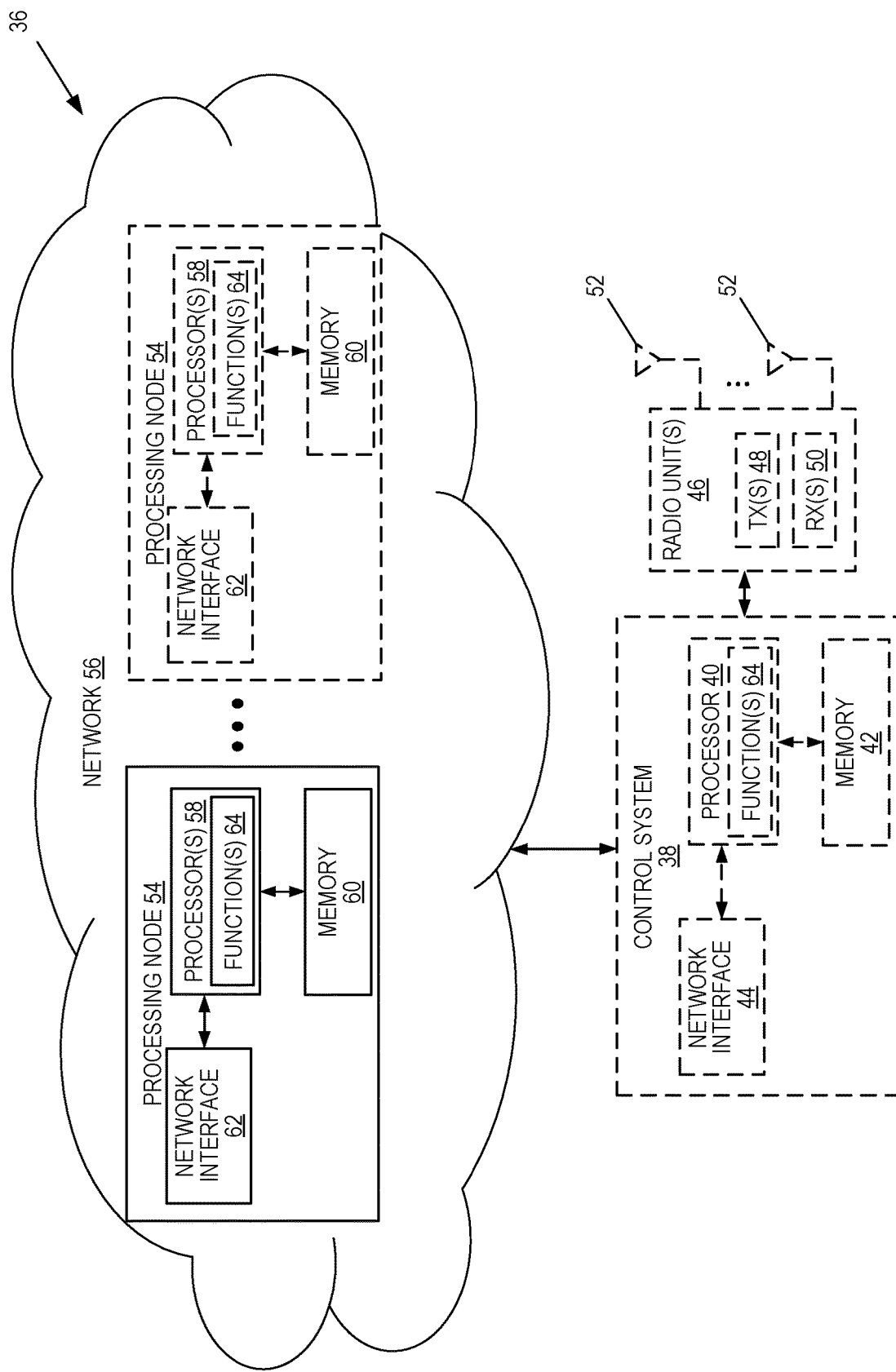

FIG. 14 is a schematic block diagram that illustrates a virtualized embodiment of the network node 36 (e.g., the radio access node 14 or a core network node) according to some embodiments of the present disclosure. As used herein, a "virtualized" network node 36 is a network node 36 in which at least a portion of the functionality of the network node 36 is implemented as a virtual component (e.g., via a virtual machine(s) executing on a physical processing node(s) in a network(s)). As illustrated, the network node 36 optionally includes the control system 38, as described with respect to FIG. 13. In addition, if the network node 36 is the radio access node 14, the network node 36 also includes the one or more radio units 46, as described with respect to FIG. 13. The control system 38 (if present) is connected to one or more processing nodes 54 coupled to or included as part of a network(s) 56 via the network interface 44. Alternatively, if the control system 38 is not present, the one or more radio units 46 (if present) are connected to the one or more processing nodes 54 via a network interface(s). Alternatively, all of the functionality of the network node 36 described herein may be implemented in the processing nodes 54. Each processing node 54 includes one or more processors 58 (e.g., CPUs, ASICs, DSPs, FPGAs, and/or the like), memory 60, and a network interface 62.

In this example, functions 64 of the network node 36 (e.g., the functions of the radio access node 14) described herein with respect to, e.g., FIGS. 7 and/or 10 are implemented at the one or more processing nodes 54 or distributed across the control system 38 (if present) and the one or more processing nodes 54 in any desired manner. In some particular embodiments, some or all of the functions 64 of the network node 36 described herein are implemented as virtual components executed by one or more virtual machines implemented in a virtual environment(s) hosted by the processing node(s) 54. As will be appreciated by one of ordinary skill in the art, additional signaling or communication between the processing node(s) 54 and the control system 38 (if present) or alternatively the radio unit(s) 46 (if present) is used in order to carry out at least some of the desired functions. Notably, in some embodiments, the control system 38 may not be included, in which case the radio unit(s) 46 (if present) communicates directly with the processing node(s) 54 via an appropriate network interface(s).

In some particular embodiments, higher layer functionality (e.g., layer 3 and up and possibly some of layer 2 of the protocol stack) of the network node 36 may be implemented at the processing node(s) 54 as virtual components (i.e., implemented "in the cloud") whereas lower layer functionality (e.g., layer 1 and possibly some of layer 2 of the protocol stack) may be implemented in the radio unit(s) 46 and possibly the control system 38.

In some embodiments, a computer program including instructions which, when executed by the at least one processor 40, 58, causes the at least one processor 40, 58 to carry out the functionality of the network node 36 or a processing node 54 according to any of the embodiments described herein is provided. In some embodiments, a carrier containing the aforementioned computer program product is provided. The carrier is one of an electronic signal, an optical signal, a radio signal, or a computer readable storage medium (e.g., a non-transitory computer readable medium such as the memory 60).

Figure 15:
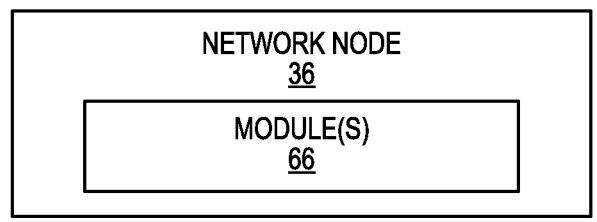

FIG. 15 is a schematic block diagram of the network node 36 (e.g., the radio access node 14 or a core network node) according to some other embodiments of the present disclosure. The network node 36 includes one or more modules 66, each of which is implemented in software. The module(s) 66 provide the functionality of the network node 36 described herein with respect to, e.g., FIG. 7 and/or FIG. 10.

The following acronyms are used throughout this disclosure.

3D Three Dimension
3GPP Third Generation Partnership Project
5G Fifth Generation
ASIC Application Specific Integrated Circuit
BSR Buffer Status Report
CoMP Coordinated Multi-Point
CPU Central Processing Unit
CSI-RS Channel State Information Reference Signal
DFT Discrete Fourier Transform
DSP Digital Signal Processor
eNB Enhanced or Evolved Node B
FPGA Field Programmable Gate Array
gNB New Radio Base Station
LTE Long Term Evolution
MME Mobility Management Entity
MTC Machine Type Communication
MU-MIMO Multi-User Multiple Input Multiple Output
NR New Radio
PCell Primary Cell
P-CPICH Primary Common Pilot Channel
P-GW Packet Data Network Gateway
PHR Power Headroom Report
PRB Physical Resource Block
RAT Radio Access Technology
RF Radio Frequency
RSRP Reference Signal Received Power
RSRQ Reference Signal Received Quality
SCEF Service Capability Exposure Function
SCell Secondary Cell
TDOA Time Difference of Arrival
TS Technical Specification
TTI Transmit Time Interval
UE User Equipment
WCDMA Wideband Code Division Multiple Access Those skilled in the art will recognize improvements and modifications to the embodiments of the present disclosure. All such improvements and modifications are considered within the scope of the concepts disclosed herein.

What is claimed is:

1. A method of operation of a network node to adjust a shape of an uplink coverage for one or more cells in a cellular communications network, comprising:
   determining that there is a need to adjust uplink beam transformations for the one or more cells of a plurality of cells in the cellular communications network to adjust the shape of the uplink coverage for the one or more cells, wherein, for each cell of the one or more cells, the uplink beam transformation for the cell is a transformation of received uplink signals for the cell from an antenna domain to a beam domain where determining that there is a need to adjust the uplink beam transformations for the one or more cells comprises:
      evaluating a mismatch between the shape of the uplink coverage of the one or more cells and a shape of a downlink coverage of the one or more cells; and
      determining that there is a need to adjust the uplink beam transformations for the one or more cells if the mismatch between the shape of the uplink coverage of the one or more cells and the shape of the downlink coverage of the one or more cells is more than a predefined threshold; and
   upon determining that there is a need to adjust the uplink beam transformations for the one or more cells:
      determining new uplink beam transformations for the one or more cells; and
      applying the new uplink beam transformations for the one or more cells.

2. The method of claim 1 wherein evaluating the mismatch between the shape of the uplink coverage of the one or more cells and the shape of the downlink coverage of the one or more cells comprises evaluating the mismatch between the shape of the uplink coverage of the one or more cells and the shape of the downlink coverage of the one or more cells in response to a change in downlink cell shaping for at least one of the one or more cells.

3. The method of claim 1 wherein determining the new uplink beam transformations for the one or more cells comprises determining the new uplink beam transformations for the one or more cells such that the new uplink beam transformations for the one or more cells reduce or minimize the mismatch between the shape of the uplink coverage of the one or more cells and the shape of the downlink coverage of the one or more cells.

4. The method of claim 3 wherein determining the new uplink beam transformations for the one or more cells comprises determining the new uplink beam transformations for the one or more cells from a plurality of predetermined uplink beam transformations such that the new uplink beam transformations are uplink beam transformations from the plurality of predetermined uplink beam transformations that provide a best match between the shape of the uplink coverage of the one or more cells and the shape of the downlink coverage of the one or more cells.

5. The method of claim 4 further comprising, after applying the new uplink beam transformations for the one or more cells:
   determining that a remaining mismatch between the shape of the uplink coverage of the one or more cells and the shape of the downlink coverage of the one or more cells is greater than a predefined threshold; and
   upon determining that the remaining mismatch between the shape of the uplink coverage of the one or more cells and the shape of the downlink coverage of the one or more cells is greater than a predefined threshold:
      computing second new uplink beam transformations for the one or more cells that reduce or minimize the remaining mismatch between the shape of the uplink coverage of the one or more cells and the shape of the downlink coverage of the one or more cells; and
      applying the second new uplink beam transformations for the one or more cells.

6. The method of claim 3 wherein determining the new uplink beam transformations for the one or more cells comprises computing the new uplink beam transformations for the one or more cells from a plurality of predetermined uplink beam transformations such that the new uplink beam transformations reduce or minimize the mismatch between the shape of the uplink coverage of the one or more cells and the shape of the downlink coverage of the one or more cells.

7. The method of claim 1 wherein determining that there is a need to adjust the uplink beam transformations for the one or more cells comprises:
   evaluating a mismatch between the shape of the uplink coverage of the one or more cells and a geographical distribution of uplink traffic of the one or more cells; and
   determining that there is a need to adjust the uplink beam transformations for the one or more cells if the mismatch between the shape of the uplink coverage of the one or more cells and the geographical distribution of uplink traffic of the one or more cells is more than a predefined threshold.

8. The method of claim 1 wherein determining the new uplink beam transformations for the one or more cells comprises determining the new uplink beam transformations for the one or more cells such that the new uplink beam transformations for the one or more cells reduce or minimize the mismatch between the shape of the uplink coverage of the one or more cells and the geographical distribution of uplink traffic of the one or more cells.

9. The method of claim 8 wherein determining the new uplink beam transformations for the one or more cells comprises determining the new uplink beam transformations for the one or more cells from a plurality of predetermined uplink beam transformations such that the new uplink beam transformations are uplink beam transformations from the plurality of predetermined uplink beam transformations that provide a best match between the shape of the uplink coverage of the one or more cells and the geographical distribution of uplink traffic of the one or more cells.

10. The method of claim 9 further comprising, after applying the new uplink beam transformations for the one or more cells:
   determining that a remaining mismatch between the shape of the uplink coverage of the one or more cells and the geographical distribution of uplink traffic of the one or more cells is greater than a predefined threshold; and
   upon determining that the remaining mismatch between the shape of the uplink coverage of the one or more cells and the geographical distribution of uplink traffic of the one or more cells is greater than a predefined threshold:
      computing second new uplink beam transformations for the one or more cells that reduce or minimize the remaining mismatch between the shape of the uplink coverage of the one or more cells and the geographical distribution of uplink traffic of the one or more cells; and
      applying the second new uplink beam transformations for the one or more cells.

11. The method of claim 8 wherein determining the new uplink beam transformations for the one or more cells comprises computing the new uplink beam transformations for the one or more cells from a plurality of predetermined uplink beam transformations such that the new uplink beam transformations reduce or minimize the mismatch between the shape of the uplink coverage of the one or more cells and the geographical distribution of uplink traffic of the one or more cells.

12. The method of claim 7 further comprising:
   evaluating whether there is a need to perform one or more handovers, one or more Coordinated Multi-Point, CoMP, set changes, and/or one or more carrier aggregation configuration changes for the one or more cells; and
   performing one or more handovers, one or more CoMP set changes, and/or one or more carrier aggregation configuration changes for the one or more cells upon determining that there is a need to perform one or more handovers, one or more CoMP set changes, and/or one or more carrier aggregation configuration changes for the one or more cells.

13. The method of claim 1 wherein the network node is a core network node of the cellular communications network.

14. The method of claim 13 wherein applying the new uplink beam transformations for the one or more cells comprises configuring the one or more cells to use the new uplink beam transformations when processing uplink signals on the one or more cells.

15. The method of claim 1 wherein the network node is a radio access node of the cellular communications network, and the one or more cells are one or more cells served by the radio access node.

16. The method of claim 15 wherein applying the new uplink beam transformations for the one or more cells comprises applying the new uplink beam transformations locally at the radio access node when processing uplink signals on the one or more cells.

17. A network node for adjusting a shape of an uplink coverage for one or more cells in a cellular communications network, comprising:
   one or more processors; and
   memory comprising instructions executable by the one or more processors whereby the network node is operable to:
      determine that there is a need to adjust uplink beam transformations for one or more cells of a plurality of cells in the cellular communications network, wherein, for each cell of the one or more cells, the uplink beam transformation for the cell is a transformation of received uplink signals for the cell from an antenna domain to a beam domain where determining that there is a need to adjust the uplink beam transformations for the one or more cells comprises being operable to:
  evaluate a mismatch between the shape of the uplink coverage of the one or more cells and a shape of a downlink coverage of the one or more cells; and
  determine that there is a need to adjust the uplink beam transformations for the one or more cells if the mismatch between the shape of the uplink coverage of the one or more cells and the shape of the downlink coverage of the one or more cells is more than a predefined threshold; and
upon determining that there is a need to adjust the uplink beam transformations for the one or more cells:
  determine new uplink beam transformations for the one or more cells; and
  apply the new uplink beam transformations for the one or more cells.

\* \* \* \* \*

UNITED STATES PATENT AND TRADEMARK OFFICE
CERTIFICATE OF CORRECTION

| | | |
|---|---|---|
| PATENT NO. | : 11,228,364 B2 | Page 1 of 1 |
| APPLICATION NO. | : 15/546042 | |
| DATED | : January 18, 2022 | |
| INVENTOR(S) | : Stephenne et al. | |

It is certified that error appears in the above-identified patent and that said Letters Patent is hereby corrected as shown below:

In the Specification

In Column 13, Line 8, delete "E" and insert -- $\epsilon$ --, therefor.

In Column 13, Line 10, delete "E" and insert -- $\epsilon$ --, therefor.

In Column 13, Line 12, delete "E" and insert -- $\epsilon$ --, therefor.

In Column 13, Line 41, delete "E." and insert -- $\epsilon$. --, therefor.

In Column 13, Line 43, delete "E." and insert -- $\epsilon$. --, therefor.

In Column 13, Line 53, delete "E." and insert -- $\epsilon$. --, therefor.

In Column 17, Line 55, above "CSI-RS Channel State Information Reference Signal" insert -- CRS Common Reference Signal --, therefor.

Signed and Sealed this
Twelfth Day of July, 2022

Katherine Kelly Vidal
*Director of the United States Patent and Trademark Office*